(12) United States Patent
Engelbrecht et al.

(10) Patent No.: US 10,301,434 B2
(45) Date of Patent: May 28, 2019

(54) BLOCK COPOLYMERS HAVING A POLYDIMETHYLSILOXANE BLOCK

(71) Applicant: BASF SE, Ludwigshafen (DE)

(72) Inventors: Lothar Engelbrecht, Berlin (DE); Frank Pirrung, Gruenstadt (DE); Clemens Auschra, Freiburg (DE); Ralf Knischka, Neustadt (DE); Reiner Kranwetvogel, Hassloch (DE)

(73) Assignee: BASF SE, Ludwigshafen (DE)

( * ) Notice: Subject to any disclaimer, the term of this patent is extended or adjusted under 35 U.S.C. 154(b) by 228 days.

(21) Appl. No.: 14/759,821

(22) PCT Filed: Jan. 17, 2014

(86) PCT No.: PCT/EP2014/050874
§ 371 (c)(1),
(2) Date: Jul. 8, 2015

(87) PCT Pub. No.: WO2014/111503
PCT Pub. Date: Jul. 24, 2014

(65) Prior Publication Data
US 2015/0337086 A1    Nov. 26, 2015

(30) Foreign Application Priority Data

Jan. 18, 2013    (EP) .................................... 13151902

(51) Int. Cl.
| | |
|---|---|
| *C08G 77/442* | (2006.01) |
| *C08G 77/00* | (2006.01) |
| *C09D 175/04* | (2006.01) |
| *C09D 183/10* | (2006.01) |
| *C09D 163/00* | (2006.01) |
| *C08J 3/20* | (2006.01) |
| *C08L 83/10* | (2006.01) |
| *C09D 151/08* | (2006.01) |
| *C09D 153/00* | (2006.01) |
| *C08L 53/00* | (2006.01) |
| *C08L 51/08* | (2006.01) |
| *C08G 81/02* | (2006.01) |

(52) U.S. Cl.
CPC ......... *C08G 77/442* (2013.01); *C08G 81/024* (2013.01); *C08L 51/085* (2013.01); *C08L 53/00* (2013.01); *C08L 83/10* (2013.01); *C09D 151/085* (2013.01); *C09D 153/00* (2013.01); *C09D 163/00* (2013.01); *C09D 175/04* (2013.01); *C09D 183/10* (2013.01)

(58) Field of Classification Search
CPC ................ C08G 77/442; C08G 77/458; C08G 81/024; C08L 83/10; C08L 53/00; C08L 51/085; C08L 75/04; C09D 183/10; C09D 153/00; C09D 151/085; C09D 175/04; C09J 183/10; C09J 153/00; C09J 151/085; C09J 175/04
See application file for complete search history.

(56) References Cited

U.S. PATENT DOCUMENTS

| | | | |
|---|---|---|---|
| 3,775,452 A | 11/1973 | Karstedt | |
| 4,486,577 A * | 12/1984 | Mueller | ............. C08F 290/148 351/159.33 |
| 4,581,429 A * | 4/1986 | Solomon | ................. C08C 19/22 526/204 |
| 5,523,373 A | 6/1996 | Esselborn et al. | |
| 6,187,374 B1 * | 2/2001 | Hardy | .................... C03C 17/32 156/94 |

(Continued)

FOREIGN PATENT DOCUMENTS

| | | |
|---|---|---|
| DE | 26 46 726 | 4/1978 |
| DE | 44 14 465 | 5/1995 |

(Continued)

OTHER PUBLICATIONS

International Search Report dated Aug. 6, 2014 in PCT/EP2014/050874 Filed Jan. 17, 2014.

*Primary Examiner* — Kregg T Brooks
(74) *Attorney, Agent, or Firm* — Oblon, McClelland, Maier & Neustadt, L.L.P.

(57) ABSTRACT

The present invention relates to novel block copolymers of general formula (I). The invention further relates to a method for producing such block copolymers and to the use of such block copolymers, particularly as additives in liquid coating-agent compositions. A{X—[O—C(O)NH—Y—NH—C(O)—O-M-B]$_k$}n (I). In formula (I), the variables have the following meanings: n is a number in the range from 1 to 40 or 2 to 40, particularly 1 to 10 or 2 to 10 and especially 2 to 5; k is 1 or 2; A is a poly(dimethylsiloxane) block; B is a polymer block constructed of ethylenically unsaturated monomers, which optionally comprises a terminal group different from hydrogen; X is a bivalent or trivalent group having 2 to 20 C atoms, which is saturated or unsaturated and which optionally bears 1, 2, 3, or 4 substituents selected from among OH, COOH, CONH2, C1-C4 alkoxy, C1-C4 alkoxycarbonyl, and halogen; Y is a bivalent hydrocarbon group having 2 to 20 C atoms, which is saturated or unsaturated, and M is a chemical bond or C2-C10 alkylene, which can be interrupted by one or two groups not directly adjacent, selected from among O, C(=O)O, and (C=O)NH and which optionally bears 1, 2, 3, or 4 substituents selected from among OH, COOH, CONH2, C1-C4 alkoxy, C1-C4 alkoxycarbonyl, and phenyl.

35 Claims, No Drawings

(56) References Cited

U.S. PATENT DOCUMENTS

| | | | |
|---|---|---|---|
| 6,545,114 B1 * | 4/2003 | Yang | C08G 77/458 |
| | | | 526/279 |
| 6,846,892 B2 * | 1/2005 | Kindt-Larsen | C08F 20/28 |
| | | | 526/260 |
| 2004/0030058 A1 | 2/2004 | Destarac et al. | |
| 2004/0054071 A1 | 3/2004 | Gobelt et al. | |
| 2009/0186979 A1 * | 7/2009 | Engelbrecht | C09D 7/47 |
| | | | 524/588 |
| 2010/0015441 A1 | 1/2010 | Zhao et al. | |
| 2010/0305231 A1 * | 12/2010 | Kennedy | C08G 18/289 |
| | | | 522/111 |
| 2013/0310464 A1 * | 11/2013 | Jaunky | C08G 18/289 |
| | | | 514/772.1 |

FOREIGN PATENT DOCUMENTS

| | | | |
|---|---|---|---|
| EP | 0 075 703 | 4/1983 | |
| EP | 1 375 605 | 1/2004 | |
| EP | 1 520 870 | 4/2005 | |
| WO | 96 18670 | 6/1996 | |
| WO | 98 01480 | 1/1998 | |
| WO | 98 44008 | 10/1998 | |
| WO | 00 07981 | 2/2000 | |
| WO | 00 71606 | 11/2000 | |
| WO | 01 90113 | 11/2001 | |
| WO | 02 08307 | 1/2002 | |
| WO | 2008 025718 | 3/2008 | |
| WO | WO-2012066084 A1 * | 5/2012 | C08G 18/289 |

\* cited by examiner

BLOCK COPOLYMERS HAVING A POLYDIMETHYLSILOXANE BLOCK

The present invention relates to new block copolymers which have a polydimethylsiloxane block and one or more polymer blocks composed of ethylenically unsaturated monomers. The invention also relates to a process for preparing such block copolymers and to their use, more particularly as additives in liquid coating material compositions.

The application of liquid polymer-based compositions (liquid systems), such as, for example, paints, printing inks, and polymer-based liquid coating materials, in thin layers to surfaces of solid substrates is often a problem if the liquid system has a high surface tension, whereas the surface tension of the substrate is low.

Liquid systems generally include not only one or more polymeric resins but also one or more solvents or diluents and also, optionally, fillers, pigments and/or additives. On account of their composition and molecular structure, modern synthetic binder systems such as epoxy resins, 2-component polyurethane systems, polyester resins, melamine resins, and also radiation-curing binders, in comparison to traditional binders based on oxidatively drying fatty acids or oils, have a comparatively high intrinsic surface tension. It is therefore often more difficult to apply liquid systems based on such synthetic binder systems to surfaces than it is to apply conventional coating materials based on alkyd resins or on comparable, oxidatively drying oils or fatty acids.

Aqueous coating material compositions in particular naturally have a high surface tension. In order to obtain a uniformly smooth and esthetically appealing surface with a high level of compactness, it is necessary to add flow control assistants to such compositions. These flow control assistants, by reducing the surface tension of the composition, bring about improved spreading of the composition over the surface of the substrate, and flow of the polymer film which forms in the course of curing, resulting in a smooth surface. On account of their capacity to promote the flow of the polymer film, which forms in the course of curing, these agents reduce the formation of defects, known as craters, which are caused by impurities acting from the outside or by impurities on the surface of the substrate.

Numerous additives are available commercially that have a promotional effect on the flow or the spread of the coating material and/or that reduce the formation of defects.

They include, in particular, poly(meth)acrylic esters, polysiloxanes and mixtures thereof, and also polyether- or polyester-modified polydimethylsiloxanes, and additionally waxes and fluorinated resins. Depending on their type, these additives have different disadvantages and may lead, for example, to increased foaming, foam stabilization, or problems in the case of subsequent coatings, or by virtue of incompatibilities may lead in turn to the coating becoming hazy or losing gloss, or to migration problems, and may adversely affect the stability of the coating composition.

Block copolymers which have a polydimethylsiloxane block and one or more polymer blocks composed of ethylenically unsaturated monomers, also referred to below as silicone hybrid polymers, have been known for some considerable time from the prior art, as for example from WO 98/01480 and the literature cited therein. Such block copolymers have a central polysiloxane block with one or two polymer blocks formed from polymerized ethylenically unsaturated monomers.

WO 00/71606 describes a process for preparing graft copolymers having a polysiloxane block, in a first step of which a radical initiator is bonded to a polysiloxane polymer in a polymer-analogous reaction, after which a polymerization of ethylenically unsaturated monomers is initiated.

WO 02/08307 describes a process for preparing graft copolymers having a polysiloxane block, in a first step of which, in a polymer-analogous reaction, a transferable group suitable for a RAFT (Reversible Addition Fragmentation chain Transfer) polymerization, such as a xanthogenate, dithioester, trithiocarbonate or dithiocarbamate group, is bonded to a polysiloxane polymer, after which a RAFT polymerization of ethylenically unsaturated monomers is initiated.

EP 1375605 A2 describes a block copolymer which has a central polysiloxane-containing main chain and one or more blocks consisting of polymerized unsaturated monomers, the block copolymers being obtainable by ATR polymerization (ATRP=atom transfer initiated radical polymerization) of ethylenically unsaturated monomers in the presence of a polysiloxane-containing prepolymer which has at least one transferable group suitable for ATRP, such as an α-halopropionyl radical, for example. The block copolymer is proposed as a flow control assistant.

A common thread in the prior-art processes is that the polysiloxane is first converted into a macroinitiator, which then acts as an initiator for a controlled radical polymerization such as RAFT or ATRP. Disadvantages are the costly and inconvenient preparation of the polysiloxane-containing macroinitiators, and the quality of the resultant products, since the often only moderate efficiency of the grafting operation results in the formation as by-product of conventional polymers, which in turn adversely affect the product quality.

It is an object of the invention, therefore, to provide silicone hybrid polymers which are easy to prepare and include a high fraction of graft polymer and only small amounts of conventional polymers. The polymers ought to be suitable in particular as additives for polymer-based liquid systems, more particularly liquid systems based on synthetic binder systems such as epoxy resins, 2-component polyurethane systems, polyester resins, melamine resins, and radiation-curing binders.

These and other objects are achieved by the block copolymers of the formula I that are described below. The invention accordingly provides a block copolymer of the general formula I:

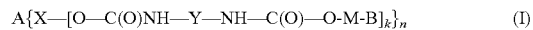  (I)

in which
n is a number in the range from 1 to 40 or 2 to 40, more particularly 1 to 10 or 2 to 10, and especially 2 to 5;
k is 1 or 2;
A is a poly(dimethylsiloxane) block;
B is a polymer block which is composed of ethylenically unsaturated monomers and which optionally has an end group other than hydrogen;
X is a divalent or trivalent radical having 2 to 20 C atoms, which is saturated or unsaturated and which optionally carries 1, 2, 3, or 4 substituents selected from OH, COOH, CONH$_2$, C$_1$-C$_4$alkoxy, C$_1$-C$_4$ alkoxycarbonyl, and halogen;
Y is a divalent hydrocarbon radical having 2 to 20 C atoms, which is saturated or unsaturated, and
M is a chemical bond or C$_2$-C$_{10}$ alkylene which may be interrupted by one or two groups that are not directly adjacent and that are selected from O, C(=O)O, and (C=O)NH, and which optionally carries 1, 2, 3, or 4 substituents selected from OH, COOH, CONH$_2$, C$_1$-C$_4$ alkoxy, C$_1$-C$_4$ alkoxycarbonyl, and phenyl.

The block copolymers of the invention are associated with a series of advantages. They can be prepared efficiently and with high grafting yields. In comparison to the silicone hybrid polymers, their fraction of conventional polymeric by-products is low. They are especially suitable as additives for polymer-based liquid formulations, more particularly liquid formulations based on synthetic binder systems such as epoxy resins, 2-component polyurethane systems, polyester resins, melamine resins, and radiation-curing binders. They exhibit a good flow-promoting effect and high compatibility with the polymeric binder systems, lead to smooth coatings, and reduce cratering. Moreover, they make the coating water repellent and are therefore suitable as dirt-repelling additives and as anti-graffiti additives for polymer-based coating material compositions.

The present invention accordingly also provides polymer compositions comprising at least one block copolymer of the formula I, of the invention, and an organic binder.

The invention accordingly also provides the use of block copolymers of the formula I as an additive in coating material formulations which comprise at least one organic binder, more particularly as flow control assistant or as dirt-repelling additive, more particularly as hydrophobizing anti-graffiti agent.

In connection with the definitions of the radicals and groups of atoms in the formula I, and also in the formulae II, III, and Z defined below, the prefix $C_n$-$C_m$ indicates the possible number of carbon atoms in a particular radical or group of atoms.

Alkyl is a saturated, linear or branched hydrocarbon radical having for example 1 to 20 or 1 to 6 or 1 to 4 C atoms. Examples of alkyl are methyl, ethyl, n-propyl, isopropyl, n-butyl, 2-butyl, isobutyl, tert-butyl, n-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, 2-ethylhexyl, nonyl, decyl, undecyl, dodecyl, tridecyl, tetradecyl, hexadecyl, octadecyl and eicosyl, including the isomers of the aforementioned groups.

Alkoxy, and also the corresponding parts of alkoxyalkoxy and alkoxyalkyl, stand for a saturated linear or branched hydrocarbon radical which is bonded via an oxygen atom and has for example 1 to 6 or 1 to 4 C atoms. Examples of alkoxy are methoxy, ethoxy, n-propyloxy, isopropyloxy, n-butoxy, 2-butoxy, isobutoxy, tert-butoxy, n-pentyloxy, and n-hexyloxy, including the isomers of the two latter groups.

Alkoxyalkyl is an alkyl radical having in general 1 to 4 C atoms, in which a hydrogen atom has been replaced by an alkoxy group having in general 1 to 4 C atoms.

Alkoxyalkoxy is an alkoxy radical having in general 1 to 4 C atoms, in which a hydrogen atom has been replaced by an alkoxy group having in general 1 to 4 C atoms.

The term "alkylene" or "alkanediyl", as used herein, denotes a straight-chain or branched, saturated divalent group having in general 1 to 10 C atoms and more particularly 21 to 6 C atoms, such as methylene, 1,2-ethanediyl, 1,2-propanediyl, 1,3-propanediyl, 1,2-butanediyl, 1,3-butanediyl, 1,4-butanediyl, 2-methyl-1,2-propanediyl, 1,6-hexanediyl, 1,7-heptanediyl, 1,9-nonanediyl, and 1,10-decanediyl, for example.

The term "alkenylene" or "alkenediyl", as used herein, denotes a straight-chain or branched, ethylenically unsaturated divalent group having in general 2 to 10 C atoms and more particularly 2 to 6 C atoms, e.g., propene-1,3-diyl, 2-butene-1,3-diyl, 2-butene-1,4-diyl, 2-pentene-1,3-diyl, 2-pentene-1,4-diyl, 2-pentene-1,5-diyl, 2-methyl-2-pentene-1,4-diyl, etc.

The term "alkanetriyl", as used herein, denotes a straight-chain or branched, saturated trivalent group having in general 1 to 10 C atoms and more particularly 1 to 6 C atoms.

The term "alkenetriyl", as used herein, denotes a straight-chain or branched, ethylenically unsaturated trivalent group having in general 2 to 10 C atoms and more particularly 2 to 6 C atoms.

The term "cycloalkylene" or "cycloalkanediyl", as used herein, denotes a divalent group which is derived from a cycloalkane and has in general 5 to 10 C atoms, such as 1,2-cyclopentanediyl, 1,3-cyclopentanediyl, 1,2-cyclohexanediyl, 1,3-cyclohexanediyl, 1,4-cyclohexanediyl, or 1,4-cycloheptanediyl, for example.

The term "cycloalkenylene" or "cycloalkenediyl", as used herein, denotes a divalent group which is derived from a cycloalkene and has in general 5 to 10 C atoms, such as 1,2-cyclopentenediyl, 1,3-cyclopentenediyl, 1,2-cyclo-3-hexenediyl, 1,3-cyclohex-4-enediyl, 1,4-cyclohex-2-enediyl, or 1,4-cyclohept-2-enediyl, for example.

The term "cycloalkanetriyl", as used herein, denotes a trivalent group which is derived from a cycloalkane and has in general 5 to 10 C atoms.

The term "cycloalkenetriyl", as used herein, denotes a trivalent group which is derived from a cycloalkene.

A polydimethylsiloxane block is understood to be a linear or branched polymer residue which is composed predominantly, i.e., to an extent of at least 90 wt. %, of repeating units of the formula [—Si(CH$_3$)$_2$—O—]. In addition, the polydimethylsiloxane block generally has at least one terminal group of the formula (CH$_3$)$_3$Si—O— or (CH$_3$)$_2$SiH—O—, and optionally branching sites >Si(CH$_3$)—O. The polydimethylsiloxane block may also, moreover, have one or more hydrosilane units of the formula [—Si(CH$_3$)H—O—].

With regard to preferred embodiments of the block copolymers of the invention, the variables in formula I, alone or, more particularly, in combination, have the following particular definitions.

The variable n is a number in the range from 1 to 40, more particularly 1 to 10, or 2 to 5. A skilled person understands that the value n represents an average value, namely a numerical average, since the block copolymers generally constitute mixtures of different polymer molecules, which differ generally in the relative number of the polymer blocks A and B.

A is preferably a substantially ring-free polydimethylsiloxane block, having substantially no cyclic structural units, meaning that less than 10% of the silicon atoms are part of a cyclic siloxane unit. More particularly A is a linear polydimethylsiloxane block.

More particularly A is a polydimethylsiloxane block, especially a linear polydimethylsiloxane block, which has a number-average molecular weight in the range from 200 to 20 000 g/mol, especially 500 to 10 000 g/mol. The molecular weight of the polydimethylsiloxane block can be determined in a conventional way, as for example indirectly by determining the relative number of Si-bonded methyl groups by means of NMR spectroscopy when the molecular weight of the block copolymer is known.

Generally speaking, the polydimethylsiloxane block A makes up 0.1 to 70 wt. %, more particularly 0.5 to 40 wt. %, and especially 1 to 30 wt. %, based on the total mass of the block copolymer.

In accordance with the invention, the polymer block B is composed of polymerized units of ethylenically unsaturated monomers M, more particularly predominantly or entirely of polymerized units of monoethylenically unsaturated monomers. The fraction of polyethylenically unsaturated monomers, based on the total amount of the constituent monomers M of the polymer block B, will generally not exceed 5 wt. %, and in particular will not be more than 1 wt. %.

Examples of monoethylenically unsaturated monomers are, in particular, neutral monoethylenically unsaturated monomers, examples being the monomers of the groups M1 to M11 below, more particularly the monomers of groups M1, M2, M3, M6, M7, M8, M9, and M10:

M1 esters of monoethylenically unsaturated $C_3$-$C_6$ monocarboxylic acids with $C_1$-$C_{20}$ alkanols, $C_5$-$C_8$ cycloalkanols, phenyl-$C_1$-$C_4$ alkanols, or phenoxy-$C_1$-$C_4$ alkanols, more particularly the aforementioned esters of acrylic acid and also the aforementioned esters of methacrylic acid, examples being methyl acrylate, ethyl acrylate, n-propyl acrylate, isopropyl acrylate, n-butyl acrylate, 2-butyl acrylate, isobutyl acrylate, tert-butyl acrylate, n-hexyl acrylate, 2-ethylhexyl acrylate, 3-propylheptyl acrylate, decyl acrylate, lauryl acrylate, stearyl acrylate, cyclohexyl acrylate, benzyl acrylate, 2-phenylethyl acrylate, 1-phenylethyl acrylate, 2-phenoxyethyl acrylate, and also the esters of methacrylic acid such as methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, decyl methacrylate, lauryl methacrylate, stearyl methacrylate, cyclohexyl methacrylate, benzyl methacrylate, 2-phenylethyl methacrylate, 1-phenylethyl methacrylate, and 2-phenoxyethyl methacrylate;

M2 vinylaromatic hydrocarbons, such as, for example, styrene, vinyltoluenes, tert-butylstyrene, α-methyl styrene, and the like, more particularly styrene;

M3 vinyl, allyl, and methallyl esters of saturated aliphatic $C_2$-$C_{18}$ monocarboxylic acids, such as, for example, vinyl acetate, vinyl propionate, vinyl butyrate, vinyl pivalate, vinyl hexanoate, vinyl-2-ethylhexanoate, vinyl laurate, and vinylstearate, and also the corresponding allyl and methallyl esters, and M4 α-olefins having 2 to 20 C atoms and cycloolefins having 5 to 10 C atoms, such as ethene, propene, 1-butene, isobutene, 1-pentene, cyclopentene, cyclohexene, and cycloheptene;

M5 esters of monoethylenically unsaturated $C_3$-$C_6$ monocarboxylic acids with polyether monools, more particularly with $C_2$-$C_{20}$ alkylpoly-$C_2$-$C_4$ alkylene glycols, especially with $C_1$-$C_{20}$ alkylpolyethylene glycols, the alkylpolyalkylene glycol radical typically having a molecular weight in the range from 200 to 5000 g/mol (numerical average), more particularly the aforementioned esters of acrylic acid and also the aforementioned esters of methacrylic acid;

M6 monoethylenically unsaturated nitriles such as acrylonitrile or methacrylonitrile;

M7 amides of the aforementioned monoethylenically unsaturated $C_3$-$C_8$ monocarboxylic acids, more particularly acrylamide and methacrylamide;

M8 N—($C_1$-$C_{20}$ alkyl)amides and N,N-di($C_1$-$C_{20}$ alkyl) amides of the aforementioned monoethylenically unsaturated $C_3$-$C_8$ monocarboxylic acids;

M9 hydroxyalkyl esters of the aforementioned monoethylenically unsaturated $C_3$-$C_8$ monocarboxylic acids, e.g., hydroxyethylacrylate, hydroxyethyl methacrylate, 2- and 3-hydroxypropyl acrylate, and 2- and 3-hydroxypropyl methacrylate; and M10 N-vinyl amides of aliphatic $C_1$-$C_{10}$ carboxylic acids, and N-vinyllactams, such as N-vinylformamide, N-vinylacetamide, N-vinylpyrrolidone, and N-vinylcaprolactam.

Neutral monoethylenically unsaturated monomers, such as the monomers of groups M1 to M10, for example, more particularly the monomers of groups M1, M2, M5, M6, M7, M8, and M9, make up generally at least 80 wt. %, more particularly at least 90 wt. %, and especially at least 95 wt. %, or the total amount, of the constituent monomers of the polymer block B.

Examples of monoethylenically unsaturated monomers are also basic and cationic monoethylenically unsaturated monomers, such as the monomers of groups M11 to M14 below:

M11 vinyl heterocycles such as 2-vinylpyridine, 3-vinylpyridine, 4-vinylpyridine, and N-vinylimidazole;

M12 quaternized vinyl heterocycles such as 1-methyl-2-vinylpyridinium salts, 1-methyl-2-vinylpyridinium salts, 1-methyl-4-vinylpyridinium salts, and N-methyl-N'-vinylimidazolium salts, such as the chlorides or methosulfates;

M13 N,N-(di-$C_1$-$C_{10}$ alkylamino)-$C_2$-$C_4$ alkylamides and N,N-(di-$C_1$-$C_{10}$ alkylamino)-$C_2$-$C_4$ alkyl esters of the aforementioned monoethylenically unsaturated $C_3$-$C_8$ monocarboxylic acids, examples being 2-(N,N-dimethylamino)ethylacrylamide, 2-(N,N-dimethylamino)ethylmethacrylamide, 2-(N,N-dimethylamino)propylacryl-amide, 2-(N,N-dimethylamino) propylmethacrylamide, 3-(N,N-dimethylamino) propylacrylamide, 3-(N,N-dimethylamino) propylmethacrylamide, 2-(N,N-diethylamino) ethylacrylamide, 2-(N,N-diethylamino) ethylmethacrylamide, 2-(N,N-diethylamino) propylacrylamide, 2-(N,N-diethylamino) propylmethacrylamide, 3-(N,N-diethylamino) propylacrylamide, 3-(N,N-diethylamino) propylmethacrylamide, 2-(N,N-dimethylamino)ethyl acrylate, 2-(N,N-dimethylamino)ethyl methacrylate, 2-(N,N-dimethylamino)propyl acrylate, 2-(N,N-dimethylamino)propyl methacrylate, 3-(N,N-dimethylamino)propyl acrylate, 3-(N,N-dimethylamino)propyl methacrylate, 2-(N,N-diethylamino)ethyl acrylate, 2-(N,N-diethylamino)ethyl methacrylate, 2-(N,N-diethylamino)propyl acrylate, 2-(N,N-diethylamino)propyl methacrylate, and 3-(N,N-diethylamino)propyl acrylate and 3-(N,N-diethylamino)propyl methacrylate;

M14 N,N-(tri-$C_1$-$C_{10}$-alkylammonium)-$C_2$-$C_4$ alkylamides and N,N-(tri-$C_1$-$C_{10}$ alkylammonium)-$C_2$-$C_4$ alkyl esters of the aforementioned monoethylenically unsaturated $C_3$-$C_8$ monocarboxylic acids, examples being 2-(N,N,N-trimethylammonium)ethylacrylamide, 2-(N,N,N-trimethylammonium)ethylmethacrylamide, 2-(N,N-trimethyl-ammonium)propylacrylamide, 2-(N,N,N-trimethylammonium)propylmethacrylamide, 3-(N, N,N-trimethylammonium)propyl-acrylamide, 3-(N,N,N-trimethylammonium)propylmethacrylamide, 2-(N,N,N-triethylammonium)ethylacrylamide, 2-(N,N,N-triethylammonium)ethylmethacrylamide, 2-(N,N,N-triethylammonium)-propylacrylamide, 2-(N,N,N-triethylammonium)propylmethacrylamide, 3-(N,N,N-triethylammonium)propylacrylamide, 3-(N,N,N-triethylammonium)-propylmethacrylamide, 2-(N,N,N-trimethylammonium)ethyl acrylate, 2-(N,N,N-trimethylammonium)ethyl methacrylate, 2-(N,N,N-trimethylammonium)propyl acrylate, 2-(N,N,N-trimethylammonium)propyl methacrylate, 3-(N,N,N-trimethyl-ammonium)propyl acrylate, 3-(N,N,N-trimethylammonium)propyl methacrylate, 2-(N,N,N-triethylammonium)ethyl acrylate, 2-(N,N,N-triethylammonium)ethyl methacrylate, 2-(N,N,N-triethylammonium)propyl acrylate, 2-(N,N,N-triethylammonium)propyl methacrylate, and 3-(N,N,N-triethylammonium)propyl acrylate and 3-(N,N,N-triethylammonium)propyl methacrylate, more particularly the chlorides, methosulfates, and ethosulfates thereof.

The basic and cationic monoethylenically unsaturated monomers, more particularly the aforementioned monomers M11 to M14, make up generally not more than 20 wt. %, more particularly not more than 10 wt. %, and especially not more than 5 wt. %, of the constituent monomers M of the polymer block B.

The polymer block B is composed preferably to an extent of at least 50 wt. %, more particularly at least 70 wt. %, especially at least 80 wt. %, very especially at least 90 wt. %, based on B or on the total amount of the constituent monomers M of the polymer block B, or entirely, of monoethylenically unsaturated monomers selected from esters of acrylic acid with $C_1$-$C_{20}$ alkanols, esters of methacrylic acid with $C_1$-$C_{20}$ alkanols, esters of acrylic acid with $C_5$-$C_{20}$ cycloalkanols, esters of methacrylic acid with $C_5$-$C_{20}$ cycloalkanols, esters of acrylic acid with polyethermonools, and esters of methacrylic acid with polyethermonools.

More particularly the polymer block B is composed to an extent of at least 50 wt. %, more particularly at least 70 wt. %, especially at least 80 wt. %, or at least 90 wt. %, based on B or on the total amount of the constituent monomers M of the polymer block B, or entirely, or monoethylenically unsaturated monomers selected from esters of acrylic acid with $C_1$-$C_{10}$ alkanols, esters of methacrylic acid with $C_1$-$C_{10}$ alkanols, esters of acrylic acid with polyethermonools, and esters of methacrylic acid with polyethermonools.

Generally speaking, the polymer block B has a number-average molecular weight in the range from 1000 to 50 000 g/mol, more particularly 2000 to 20 000 g/mol. The molecular weight of the polymer block B can be determined in a conventional way, as for example indirectly by determining the relative number of the groups characteristic of the polymer block B, by means of NMR spectroscopy, where the molecular weight of the block copolymer is known.

In one specific embodiment the blocks B of the block copolymers of the invention have a terminal group of the formula Z

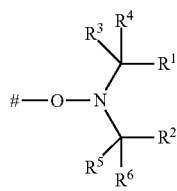

(Z)

in which # denotes the attachment to a C atom of the polymer block B, $R^1$ and $R^2$ independently of one another are $C_1$-$C_{20}$ alkyl which optionally carries a substituent selected from $C_1$-$C_4$ alkoxy and $C_1$-$C_4$ alkoxy-$C_1$-$C_4$alkoxy, or $R^1$ and $R^2$ together are linear $C_2$-$C_{10}$ alkylene or linear $C_2$-$C_{10}$ alkenylene in which optionally one $CH_2$ group may have been replaced by O, C=O, or $NR^x$, where linear $C_2$-$C_{10}$ alkylene and linear $C_2$-$C_{10}$ alkenylene are unsubstituted or have 1, 2, 3, or 4 substituents from the group $C_1$-$C_4$ alkyl, $C_1$-$C_4$ alkoxy, $C_1$-$C_4$ alkoxy-$C_1$-$C_4$ alkoxy, COOH, and $CONH_2$, and $R^x$ is $C_1$-$C_4$ alkyl or $C_1$-$C_4$ alkoxy;

$R^3$, $R^4$, $R^5$, and $R^6$ independently of one another are $C_1$-$C_4$ alkyl, and more particularly methyl or ethyl.

In formula Z preferably $R^1$ and $R^2$ together are linear $C_2$-$C_{10}$ alkylene, in which, optionally, one or two $CH_2$ groups may have been replaced by O, C=O or $NR^x$, and where linear $C_2$-$C_{10}$ alkylene is unsubstituted or has 1, 2, 3, or 4 substituents from the group of $C_1$-$C_4$ alkyl, $C_1$-$C_4$ alkoxy, $C_1$-$C_4$ alkoxy-$C_1$-$C_4$ alkoxy, COOH, and $CONH_2$, and $R^x$ is $C_1$-$C_4$ alkyl or $C_1$-$C_4$ alkoxy.

In formula Z more particularly $R^1$ and $R^2$ together are linear $C_2$-$C_4$ alkylene and especially are 1,3-propanediyl, in which optionally one or two $CH_2$ groups may have been replaced by O, C(=O), or $NR^x$, where linear $C_2$-$C_4$ alkylene or 1,3-propanediyl is unsubstituted or has 1, 2, 3, or 4 substituents from the group of $C_1$-$C_4$ alkyl and $C_1$-$C_4$ alkoxy, and $R^x$ is $C_1$-$C_4$ alkyl, especially methyl.

Generally speaking, the polymer block B makes up 20 to 99 wt. %, more particularly 50 to 98 wt. %, and especially 60 to 95 wt. %, based on the total mass of the block copolymer.

The block copolymers of the invention preferably have a number-average molecular weight $M_n$ in the range from 1500 to 200 000 g/mol, more particularly 2000 to 100 000 g/mol. The weight-average molecular weight $M_w$ of the block copolymers of the invention is situated typically in the range from 2500 to 30000 g/mol and more particularly in the range from 3000 to 20000 g/mol. The polydispersity, i.e., the ratio $M_w/M_n$, is situated typically in the range from 1 to 2 and more particularly in the range from 1.2 to 1.6.

In formula I, X more particularly is $C_2$-$C_{10}$ alkylene or $C_2$-$C_{10}$ alkenylene, more preferentially $C_2$-$C_6$ alkylene or $C_2$-$C_6$ alkenylene which is unsubstituted or has 1 or 2 substituents from the group of OH, $C_1$-$C_4$ alkoxy, COOH, and $C_1$-$C_4$ alkoxycarbonyl. $C_2$-$C_{10}$ Alkylene may also be interrupted by 1, 2, 3, or 4 nonadjacent oxygen atoms. Particular examples of X are 1,3-propanediyl, 1,3-butanediyl, 1,4-butanediyl, 1,5-pentanediyl, 3-methyl-1,3-butanediyl, 1-propene-1,3-diyl, 1-butene-1,4-diyl, 2-butene-1,2-diyl, 2-butene-1,3-diyl, 4-hydroxy-2-butene-1,2-diyl, 4-hydroxy-2-butene-1,3-diyl, 3-oxapentane-1,5-diyl, 3-oxahexane-1,6-diyl, 3,6-dioxaoctane-1,8-diyl, 3,7-dioxanonane-1,9-diyl or 3,6,9-dioxaundecane-1,11-diyl.

Y in formula I is preferably a divalent radical which is selected from $C_2$-$C_{10}$ alkylene, $C_2$-$C_{10}$ alkenylene, $C_5$-$C_{10}$ cycloalkylene, which optionally has 1, 2, or 3 methyl groups, or from phenylene, which optionally has 1, 2, or 3 methyl groups, or from a group Q-R-$(Q)_q$, in which q is 0 or 1 and more particularly is 0, Q is $C_5$-$C_{10}$ cycloalkylene, more particularly $C_5$-$C_6$ cycloalkylene, which optionally has 1, 2, or 3 methyl groups, or phenylene, which optionally has 1, 2, or 3 methyl groups, and R is $C_1$-$C_{10}$ alkylene and more particularly is $CH_2$.

More particularly, Y in formula I is a divalent radical which is selected from $C_4$-$C_6$ alkylene, $C_5$-$C_6$ cycloalkylene, which optionally has 1, 2, or 3 methyl groups, 1,3-phenylene, which optionally has 1, 2, or 3 methyl groups, or a group Q-R-(Q)$_q$, in which Q, R, and q have the definitions stated above and in which q more particularly is 0, Q more particularly is C$_5$-C$_6$ cycloalkylene, which optionally has 1, 2, or 3 methyl groups, and R more particularly is CH$_2$.

In formula I, Y is frequently a radical derived from a diisocyanate, more particularly from a diisocyanate whose isocyanate groups have different reactivities, such as in diisocyanates, in which one of the two isocyanate groups is bonded to a C atom of an aromatic radical which in the two ortho-positions carries no further substituents, and the other of the two isocyanate groups is attached to a C atom of an aromatic radical which in at least one of the two ortho-positions carries no further substituents, or such as in diisocyanates in which one of the two isocyanate groups is bonded to a C atom of an aromatic radical and the other of the two isocyanate groups is bonded to a C atom, more particularly to a primary C atom, of an aliphatic radical, or such as in diisocyanates in which one of the two isocyanate groups is bonded to a secondary C atom of an aliphatic or cycloaliphatic radical and the other of the two isocyanate groups is bonded to a primary C atom of an aliphatic radical. Examples of diisocyanates are toluene 2,4-diisocyanate, toluene 2,6-diisocyanate, commercially available mixture of toluene 2,4- and 2,6-diisocyanate (TDI), m-phenylene diisocyanate, 3,3'-diphenyl-4,4'-biphenylene diisocyanate, 4,4'-biphenylene diisocyanate, 4,4'-diphenylmethane diisocyanate, 3,3'-dichloro-4,4'-biphenylene diisocyanate, cumene 2,4-diisocyanate, 1,5-naphthalene diisocyanate, p-xylylene diisocyanate, p-phenylene diisocyanate, 4-methoxyphenylene 1,3-diisocyanate, 4-chlorophenylene 1,3-diisocyanate, 4-bromo-phenylene 1,3-diisocyanate, 4-ethoxyphenylene 1,3-diisocyanate, 2,4-dimethylphenylene 1,3-diisocyanate, 5,6-dimethylphenylene 1,3-diisocyanate, 2,4-diisocyanatodiphenyl ether, benzidine diisocyanate, 4,6-dimethylphenylene 1,3-diisocyanate, anthracene 9,10-diisocyanate, 4,4'-diisocyanatobibenzyl, 3,3'-dimethyl-4,4''-diisocyanatodiphenylmethanes, 2,6-dimethyl-4,4'-diisocyanatobiphenyl, 2,4-diisocyanatostilbene, 3,3'-dimethoxy-4,4'-diisocyanatobiphenyl, anthracene 1,4-diisocyanate, fluorene 2,5-diisocyanate, naphthalene 1,8-diisocyanate, 2,6-diisocyanatobenzofuran, and also aliphatic and cycloaliphatic diisocyanates such as isophorone diisocyanate (IPDI), ethylene diisocyanate, ethylidenediisocyanate, propylene 1,2-diisocyanate, propylene-1,3-diisocyanate, butylene 1,4-diisocyanate, hexylene 1,6-diisocyanate (=hexamethylene diisocyanate or HDI), decylene 1,10-diisocyanate, cyclohexylene 1,2-diisocyanate, cyclohexylene 1,4-diisocyanate, and methylenedicyclohexyl diisocyanate.

Examples of diisocyanates whose isocyanate groups differ in their reactivities are toluene 2,4-diisocyanate, toluene 2,6-diisocyanate, and also mixture of toluene 2,4- and 2,6-diisocyanate and cis- and trans-isophorone diisocyanate.

In particular, Y is a divalent radical of the formula Ya in which r is 0, 1, 2, 3, or 4, and more particularly is 1 or 2, and R is C$_1$-C$_4$ alkyl and more particularly is methyl. In particular, Y is a radical of the formula Yb:

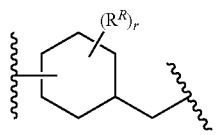

Ya

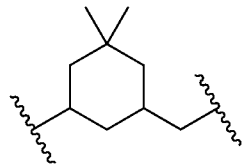

Yb

M in formula I is preferably a chemical bond or is C$_2$-C$_8$ alkylene, which may optionally be interrupted by a group selected from O, C(=O)O, and (C=O)NH— for example, is a radical of the formula Ma:

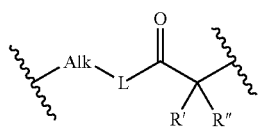

Ma

In formula Ma, Alk is linear or branched C$_1$-C$_4$ alkylene. L denotes O or NH, and R and R', independently of one another, denote hydrogen or C$_1$-C$_4$ alkyl, more particularly H or methyl, with the total number of carbon atoms in Alk, R', and R" being in the range from 2 to 8. More particularly M is a group Ma.

The block copolymers of the invention can be prepared in analogy to customary processes for preparing block copolymers. The two processes described below, of the first and second preferred embodiments, have nevertheless proven particularly suitable, with the process of the first embodiment being particularly preferred. Such processes are likewise provided by the present invention.

According to a first preferred embodiment, the preparation of the block copolymers of the invention encompasses the following steps:

i) providing an OH-functionalized poly(dimethylsiloxane) of the formula A[X(—OH)$_k$]$_n$, in which A, X, k, and n have the above-specified definitions, and more particularly those definitions introduced by preferably, more particularly, or especially, ii) providing an OH-functionalized polymer B-M-OH which is composed of ethylenically unsaturated monomers and in which B and M have the above-specified definitions, and more particularly the definitions introduced by preferably, more particularly, or especially;

iii) reacting the OH-functionalized polymer B-M-OH which is composed of ethylenically unsaturated monomers with a diisocyanate of the formula II

O=C=N—Y—N=C=O     (II)

to give an isocyanate-functionalized polymer of the formula III:

O=C=N—Y—NH—C(O)—O-M-B     (III)

in which Y in the formulae II and III has the above-specified definitions, and more particularly the definitions introduced by preferably, more particularly, or especially;

iv) reacting the isocyanate-functionalized polymer of the formula III with the OH-functionalized poly(dimethylsiloxane) of the formula A[X(—OH)$_k$]$_n$ provided in step i).

According to a second preferred embodiment, the preparation of the block copolymers of the invention encompasses the following steps:

i) providing an OH-functionalized poly(dimethylsiloxane) of the formula A[X(—OH)$_k$]$_n$, in which A, X, k, and n have the above-specified definitions, and more particularly the definitions introduced by preferably, more particularly, or especially, ii) providing an OH-functionalized polymer B-M-OH which is composed of ethylenically unsaturated monomers and in which B and M have the above-specified definitions, and more particularly the definitions introduced by preferably, more particularly, or especially, iii) reacting the OH-functionalized poly(dimethylsiloxane) of the formula A[X(—OH)$_k$]$_n$, provided in step i), with a diisocyanate of the formula II

to give an isocyanate-functionalized polydimethylsiloxane of the formula IV:

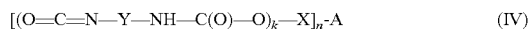

in which Y in the formulae II and IV has the above-specified definitions, and A, X, k, and n in formula IV have the above-specified definitions;

iv) reacting the isocyanate-functionalized polymer of the formula III with the OH-functionalized polymer B-M-OH composed of ethylenically unsaturated monomers that was provided in step ii).

According to step i) of the processes of the invention, an OH-functionalized poly(dimethylsiloxane) of the formula A[X(—OH)$_k$]$_n$ is provided. Some OH-functionalized poly(dimethylsiloxanes) of the formula A[X(—OH)$_k$]$_n$ are known or even available commercially, examples being the Silaplane® FM04 products from Chisso Corporation, e.g., Silaplane® FM0411, Silaplane® FM0421, or Silaplane® FM0425, and the Silaplane® DA products from Chisso Corporation, e.g., Silaplane® DA11, Silaplane® DA21, and Silaplane® DA26.

The OH-functionalized poly(dimethylsiloxanes) of the formula A[X(—OH)$_k$]$_n$ may also be prepared, in a conventional way, by functionalization of poly(dimethylsiloxanes) of the formula A(-H)$_n$ that have corresponding Si—H groups, where A and n have the above-stated definitions, and n corresponds to the number of Si—H groups in the poly(dimethylsiloxane) of the formula A(-H)$_n$.

The OH functionalization of the poly(dimethylsiloxanes) of the formula A(-H)$_n$ is accomplished for example by reaction of poly(dimethylsiloxanes) of the formula A(-H)$_n$ with olefinically or acetylenically unsaturated compounds which carry k hydroxyl groups, where k is 1 or 2. Examples of such compounds are allyl alcohol (prop-2-en-1-ol), propargyl alcohol (prop-2-yn-1-ol), 1,4-butynediol (but-2-yn-1,4-diol), 5-hexenol, ethylene glycol monoallyl ether, propylene glycol monoallyl ether, ethylene glycol monopropynyl ether, propylene glycol monopropynyl ether, monoallyl- or monovinyl-terminated diethylene glycol or triethylene glycol, and also monopropynyl-terminated diethylene glycol or triethylene glycol. The reaction of poly(dimethylsiloxanes) of the formula A(-H)$_n$ with olefinically or acetylenically unsaturated compounds which carry k hydroxyl groups is accomplished in analogy to methods known from the literature, as described from DE 2646726, EP 75703, U.S. Pat. No. 3,775,452, EP 1520870 and the literature cited therein (see paragraph 0003 of EP 1520870 A1), as for example by reaction of the reactants in an aprotic solvent in the presence of catalytic amounts of transition metal compounds, more particularly ruthenium compounds, palladium compounds or, in particular, platinum compounds such as hexachloroplatinic acid.

Poly(dimethylsiloxanes) of the formula A(-H)$_n$ are known from the literature (see, for example, EP 1520870 and literature cited therein) and are available commercially, as for example under the type designation BAYSILONE MH-xx, e.g., BAYSILONE MH15, or Dow Corning® 1107 Fluid, or can be prepared by methods known from the literature, by equilibrating cyclic or linear oligo- and/or polydimethylsiloxanes, where some of the oligo- and/or polydimethylsiloxanes used for the equilibration must have SiH groups (see, for example, WO 96/18670). The equilibration takes place typically with acid catalysis, using trifluoromethanesulfonic acid, for example. Examples of oligo- and/or polydimethylsiloxanes used for the oligomerization are tetramethyldisiloxane, hexamethyldisiloxane, heptamethyltrisiloxane, cyclotetradimethylsiloxane(=octamethylcyclotetrasiloxane), cyclopentadimethylsiloxane, and cyclohexadimethylsiloxane, and mixtures thereof.

The provision of an OH-functionalized polymer B-M-OH, composed of ethylenically unsaturated monomers, is accomplished by radical polymerization, more particularly by controlled radical polymerization of the ethylenically unsaturated monomers that constitute the polymer block, in the presence of an OH-functionalized chain transfer agent ("regulator") or mediator.

By a controlled or living radical polymerization is meant a polymerization in which the radicals are not present permanently as free radicals on the chain ends of the growing polymer chain, but instead, in contrast to the situation with a conventional radical polymerization, are present in equilibrium with a nonradical form, as a result of dissociation/recombination processes, and are continually being formed anew under polymerization conditions. Methods for controlled radical polymerization are known for example from "Controlled/Living radical polymerization: Progress in ATRP, NMP, and RAFT" (Matyjaszewski, K.), Washington, D.C.: American Chemical Society, 2000, and the literature cited therein.

The preparation of the polymer B-M-OH by radical polymerization may take place in accordance with customary polymerization techniques, as for example by polymerization in bulk, in solution, by emulsion polymerization or suspension polymerization.

One preferred method for providing an OH-functionalized polymer B-M-OH composed of ethylenically unsaturated monomers is that of controlled radical polymerization by the NMP method (nitroxide-mediated polymerization). This method is known from the literature, as for example from P. Nesvadba, Chimia 60 (2006) 832-840 and literature [60] to [70] cited therein, and also from WO 98/44008, WO 00/07981, and WO 01/90113.

In the case of a controlled radical polymerization by the NMP method, the monomers to be polymerized are typically polymerized in the presence of a compound HO-M'-Z, i.e., a compound of the formula V

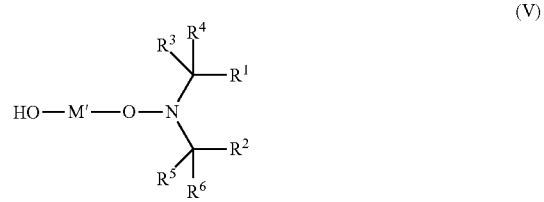

in which $R^1$, $R^2$, $R^3$, $R^4$, $R^5$ and $R^6$ have the definitions stated above for formula Z. In formula V, M' has one of the definitions, other than a chemical bond, stated above for M in formula I.

Preferably, in formula V, $R^1$ and $R^2$ together are linear $C_2$-$C_{10}$ alkylene, in which, optionally, a $CH_2$ group may have been replaced by O, C=O, or $NR^x$, this linear $C_2$-$C_{10}$ alkylene being unsubstituted or having 1, 2, 3, or 4 substituents from the group of $C_1$-$C_4$ alkyl, $C_1$-$C_4$ alkoxy, $C_1$-$C_4$ alkoxy-$C_1$-$C_4$ alkoxy, COOH, and $CONH_2$, and $R^x$ is $C_1$-$C_4$ alkyl or $C_1$-$C_4$ alkoxy.

More particularly, in formula V, $R^1$ and $R^2$ together are linear $C_2$-$C_4$ alkylene and especially 1,3-propanediyl, in which, optionally, a $CH_2$ group may have been replaced by O, C(=O), or $NR^x$, and this linear $C_2$-$C_4$ alkylene or 1,3-propanediyl is unsubstituted or has 1, 2, 3, or 4 substituents from the group $C_1$-$C_4$ alkyl and $C_1$-$C_4$ alkoxy, and $R^x$ is $C_1$-$C_4$ alkyl, especially methyl.

More particularly, in formula V, $R^3$, $R^4$, $R^5$, and $R^6$ independently of one another are methyl or ethyl.

Preferably, in formula V, M' is $C_2$-$C_8$ alkylene, which may optionally be interrupted by a group selected from O, C(=O)O, and (C=O)NH, as for example a radical of the formula Ma':

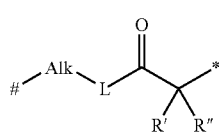

In formula Ma', Alk is linear or branched $C_1$-$C_4$alkylene. L is O or NH, R and R' independently of one another are hydrogen or $C_1$-$C_4$ alkyl, more particularly H or methyl, with the total number of carbon atoms in Alk, R', and R" being in the range from 2 to 8. More particularly M' is a group Ma'. The index * stands for the point of attachment to the nitrogen atom of Z, and the index # stands for the point of attachment to the oxygen atom of the hydroxyl group.

For polymerization by the NMP method, the monomers to be polymerized will be polymerized in the presence of a compound of the formula IV. For this purpose, generally speaking, a mixture which comprises at least part, preferably at least 50%, of the monomers to be polymerized, and at least one compound of the formula V, will be heated to the temperature needed for polymerization. Any remainder of the monomers will then be supplied to the polymerization under polymerization conditions.

The amount of compound of the formula V is typically in the range from 0.1 to 20 wt. % and more particularly in the range from 1 to 10 wt. %, based on the monomers to be polymerized.

The polymerization by the NMP method takes place typically in bulk or in a solvent or solvent mixture. Examples of solvents are, in particular, oxygen-containing organic solvents, e.g., L.1 aliphatic and cycloaliphatic alcohols such as methanol, ethanol, ethylene glycol, diethylene glycol, propylene glycol, ethylene glycol monomethyl ether, ethylene glycol monoethyl ether, and ethylene glycol monobutyl ether;

L.2 alkyl esters of aliphatic monocarboxylic and dicarboxylic acids, such as ethyl, propyl, butyl, or hexyl acetate, ethylene glycol monomethyl ether acetate, ethylene glycol monoethyl ether acetate, and ethylene glycol monobutyl ether acetate;

L.3 aliphatic and alicyclic ethers such as diethyl ether, dibutyl ether, methyl tert-butyl ether, ethyl tert-butyl ether, ethylene glycol dimethyl ether, ethylene glycol diethyl ether, tetrahydrofuran, and dioxane;

L.4 aliphatic and alicyclic ketones such as acetone, methyl ethyl ketone, and cyclohexanone;

L.5 N,N-dialkylamides of aliphatic carboxylic acids and N-alkyl lactams, such as N,N-dimethylformamide, N,N-dimethylacetamide, and N-methylpyrrolidone; and L.6: aromatic organic solvents such as benzene, toluene, or xylenes;

and also mixtures of the aforementioned organic solvents.

The polymerization takes place more particularly by the NMP method in an organic solvent or solvent mixture.

The polymerization temperature for the NMP method is typically in the range from 50 to 180° C. and more particularly in the range from 80 to 150° C. and may be determined by the skilled person by means of routine tests. The polymerization pressure is of minor importance and may be in the region of atmospheric pressure or slight subatmospheric pressure, e.g., >800 mbar, or at superatmospheric pressure, e.g., up to 10 bar, and higher or lower pressures may likewise be employed. The polymerization time will in general not exceed 10 hours, and is frequently in the range from 1 to 8 hours.

The polymers B-M-OH may be prepared in the reactors customary for a radical polymerization, examples being stirred tanks, more particularly those with close-clearance stirrers, including stirred tank cascades, and also tubular reactors, which may optionally have dynamic and/or static mixing elements. The reactors generally feature one or more devices for supply of the reactants and devices for removal of the products, and also, optionally, means for the supply and for the removal of the heat of reaction, and also, optionally, means for the control and/or monitoring of the reaction parameters of pressure, temperature, conversion, etc. The reactors can be operated batchwise or continuously.

After the polymerization has been ended, the polymerization mixture may be worked up in a customary way. Volatile components, such as solvents, can be removed by distillative measures. In the case of a solution polymerization, it is also possible to bring about precipitation of the resultant polymer B-M-OH, by the addition, for example, of an organic solvent in which the polymer is not soluble. Subsequent to the polymerization, optionally, it is also possible to carry out a solvent exchange, in order for example to convert the polymer B-M-OH into a solution that can be used in the subsequent steps iii) and/or iv). It is preferred to carry out the preparation of the polymers B-M-OH in an organic solvent which is also suitable for the subsequent steps iii) and/or iv), so that there is no need to isolate the polymer.

According to one first embodiment of the process of the invention, the polymer B-M-OH provided in step ii) is reacted with a diisocyanate of the formula II

to give an isocyanate-functionalized polymer of the formula III:

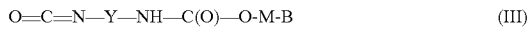

Suitable diisocyanates are the diisocyanates mentioned above in connection with the definition of Y, especially those whose isocyanate groups have different reactivities. Particularly suitable are diisocyanates of the general formula IIa

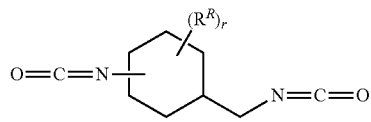

(IIa)

in which r is 0, 1, 2, 3, or 4 and more particularly is 1 or 2, and R is $C_1$-$C_4$ alkyl and more particularly is methyl, and especially isophorone diisocyanate.

For this purpose, generally speaking, the polymer B-M-OH will be reacted with the diisocyanate of the formula II in the presence of a suitable urethanization catalyst. In order to avoid the formation of multimeric adducts, i.e., adducts in which two polymers B-M-OH are linked to one another via diisocyanate units, it may be of advantage to use the diisocyanate in a slight excess. Generally speaking, however, the excess is not more than 10 mol %, based on the stoichiometry of the reaction—that is, not more than 1.1 mol are used per mole of polymer B. More particularly the diisocyanate and the polymer B-M-OH are employed in a molar ratio in the range from 1:1.1 to 1.1:1.

The reaction of the polymer B-M-OH with the diisocyanate takes place preferably in a suitable solvent or diluent. Suitable solvents and diluents are aprotic organic solvents, examples being the aforementioned organic solvents from groups L.2, L.3, L.4, L.5, and L.6.

Generally speaking, the reaction of the polymer B-M-OH with the diisocyanate takes place in the absence of moisture (<2000 ppm, preferably <500 ppm).

The reaction may take place in the absence or in the presence of small amounts of customary catalysts which promote the formation of urethanes. Examples of suitable urethanization catalysts include tertiary amines such as diazabicyclooctane (DABCO) and organotin compounds, examples being dialkyltin(IV) salts of aliphatic carboxylic acids, such as dibutyltin dilaurate and dibutyltin dioctoate. The amount of catalyst is generally not more than 0.5 wt. %, more particularly not more than 0.1 wt. %, based on the polymer B-M-OH, e.g., 0.001 to 0.5 wt. %, more particularly 0.005 to 0.1 wt. %.

The requisite reaction temperatures are of course dependent on the reactivity of the polymer B-M-OH that is used, and of the diisocyanate, and also, where one is employed, on the nature and amount of the catalyst used. The temperature is generally in the range from 20 to 100° C. and more particularly in the range from 35 to 80° C.

The resulting reaction mixture can be worked up, if desired, by means, for example, of distillative removal of solvent and optionally excess diisocyanate, preferably under reduced pressure. The reaction products obtained contain a very high fraction of polymer of the formula III. The fraction of polymer of the formula III is generally at least 80 wt. %, preferably at least 90 wt. %, of the reaction product. Generally speaking, however, no workup will be carried out, and the reaction product will be reacted directly with the OH-functionalized poly(dimethylsiloxane) of the formula $A[X-(OH)_k]_n$ that is provided in step i).

According to a second embodiment of the process of the invention, the polymer $A[X-(OH)_k]_n$ provided in step i) is reacted with a diisocyanate of the formula II, as defined above, to give an isocyanate-functionalized polymer of the formula IV:

$$[(O=C=N-Y-NH-C(O)-O)_k-X]_n-A \quad \text{(IV)}$$

in which Y in the formulae II and IV has the above-specified definitions, and A, X, k, and n in formula IV have the above-specified definitions.

Suitable diisocyanates are the diisocyanates specified above in connection with the definition of Y and in connection with step iii) of the first embodiment, more particularly those diisocyanates whose isocyanate groups have different reactivities. Particularly suitable are diisocyanates of the general formula IIa, as defined above, and especially isophorone diisocyanate.

Generally speaking, for this purpose, the polymer $A[X(-OH)_k]_n$ will be reacted with the diisocyanate of the formula II in the presence of a suitable urethanization catalyst. In order to avoid the formation of multimeric adducts, i.e., adducts in which two polymers $A[X(-OH)_k]_n$ are linked to one another via diisocyanate units, it may be of advantage to use the diisocyanate in a small excess, based on the OH groups in $A[X(-OH)_k]_n$. In general, however, the excess is not more than 10 mol %, based on the stoichiometry of the reaction—that is, not more than 1.1 mol are used per mole of OH groups in the OH-functionalized polydimethylsiloxane $A[X(-OH)_k]_n$. More particularly, the diisocyanate and the OH-functionalized polydimethylsiloxane are employed in a proportion such that the molar ratio of diisocyanate to OH groups is in the range from 1:1.1 to 1.1:1.

The reaction of the OH-functionalized polydimethysiloxane $A[X(-OH)_k]_n$ with the diisocyanate takes place preferably in a suitable solvent or diluent. Suitable solvents and diluents are aprotic organic solvents, examples being the aforementioned organic solvents from groups L.2, L.3, L.4, L.5, and L.6.

Generally speaking, the reaction of the OH-functionalized polydimethysiloxane $A[X(-OH)_k]_n$ with the diisocyanate takes place in the absence of moisture (<2000 ppm, preferably <500 ppm).

The reaction may take place in the absence or in the presence of small amounts of customary catalysts which promote the formation of urethanes. Examples of suitable urethanization catalysts include tertiary amines such as diazabicyclooctane (DABCO) and organotin compounds, examples being dialkyltin(IV) salts of aliphatic carboxylic acids, such as dibutyltin dilaurate and dibutyltin dioctoate. The amount of catalyst is generally not more than 0.5 wt. %, more particularly not more than 0.1 wt. %, based on the OH-functionalized polydimethylsiloxane $A[X(-OH)_k]_n$, e.g., 0.001 to 0.5 wt. %, more particularly 0.005 to 0.1 wt. %.

The requisite reaction temperatures are of course dependent on the reactivity of the OH-functionalized polydimethysiloxane that is used, and of the diisocyanate, and also, where one is employed, on the nature and amount of the catalyst used. The temperature is generally in the range from 20 to 100° C. and more particularly in the range from 35 to 80° C.

The resulting reaction mixture can be worked up, if desired, by means, for example, of distillative removal of solvent and optionally excess diisocyanate, preferably under reduced pressure. The reaction products obtained contain a very high fraction of the isocyanate-functionalized polydimethylsiloxane of the formula IV. The fraction of polymer of the formula IV is generally at least 80 wt. %, preferably at least 90 wt. %, of the reaction product. Generally speaking, however, no workup will be carried out, and the reaction product will be reacted directly with the OH-functionalized polymer B-M-OH that is provided in step ii).

The reaction of the isocyanate-functionalized polymer of the formula III, prepared in step iii) of the first embodiment, with the OH-functionalized polydimethylsiloxane $A[X(\text{—}OH)_k]_n$ provided in step i), and the reaction of the isocyanate-functionalized poly(dimethylsiloxane) of the formula IV, prepared in step iii) of the second embodiment, with the OH-functionalized polymer B-M-OH provided in step ii), are each accomplished in analogy to the reaction conditions specified for step iii)—to which reference is hereby made. In particular, in step iv) of the two embodiments according to the invention, the reaction mixtures obtained in step iii), which still comprise active catalyst, will be used, and so further addition of catalyst is unnecessary.

For this purpose, generally speaking, the OH-functionalized polydimethylsiloxane $A[X(\text{—}OH)_k]_n$ will be reacted with the isocyanate-functionalized polymer of the formula III and/or the OH-functionalized polymer B-M-OH will be reacted with the isocyanate-functionalized dimethylsiloxane of the formula IV in the presence of a suitable urethanization catalyst. In order to achieve complete conversion of the isocyanate groups in III and/or IV, the complementary OH-functionalized polymer, B-M-OH or $A[X(\text{—}OH)_k]_n$ respectively, will be employed in an amount such that the OH groups present in the reaction mixture are in an excess relative to the isocyanate groups present in the reaction mixture. Generally speaking, however, the excess is not more than 50 mol %, based on the stoichiometry of the reaction, i.e., the molar ratio of OH groups in B-M-OH or $A[X(\text{—}OH)_k]_n$ to the isocyanate groups in the isocyanate-functionalized polymers of the formula III and IV, respectively, will preferably not exceed a level of 1.5 mol OH per mole of NCO. More particularly the molar ratio of OH groups to isocyanate groups is in the range from 1:1.1 to 1.5:1.

The reaction in step iv) takes place preferably in a suitable solvent or diluent. Suitable solvents and diluents are aprotic organic solvents, examples being the aforementioned organic solvents of groups L.2, L.3, L.4, L.5, and L.6. Generally speaking, the reaction in step iv) takes place in the absence of moisture (<2000 ppm, preferably <500 ppm).

The reaction temperatures required for step iv) are of course dependent on the reactivity of the OH-functionalized polydimethylsiloxane and/or the polymer B-M-OH that is used, and of the isocyanate-functionalized polymers of the formula III and IV, respectively, and also, where one is used, on the nature and amount of the catalyst employed. The temperature is generally in the range from 20 to 100° C. and more particularly in the range from 35 to 80° C.

The reaction mixture obtained in step iv) may be worked up, optionally after deactivation of the catalyst, by distillation to remove solvent, for example, preferably under reduced pressure.

The polymer compositions obtained have a very high fraction of the block copolymer of the formula I according to the invention. The fraction of block copolymer of the formula I is generally at least 50 wt. %, preferably at least 70 wt. %, based on the total amount of the polymeric constituents of the reaction product.

Accordingly, the present invention also relates to a polymer composition which comprises at least one block copolymer of the formula I and which more particularly comprises at least 50 wt. %, especially at least 70 wt. %, based on the total weight of the polymer composition, of at least one block copolymer of the formula I. The present invention in particular also relates to a polymer composition of this kind which is obtainable by a process according to one of the two embodiments of the process of the invention.

As already mentioned in the introduction, the block copolymers of the formula I according to the invention and also the polymer compositions of the invention which comprise at least one block copolymer of the formula I, more particularly in an amount of at least 50 wt. %, especially in an amount of at least 70 wt. %, based on the total weight of the polymer composition, are suitable as additives in coating material formulations, more particularly in liquid coating material formulations which comprise at least one organic binder.

In coating material formulations of these kinds, the block copolymers of the formula I according to the invention act as additives which promote the uniform spread of the coating composition over the substrate surface to be coated, and therefore lead to smoother coatings than in the case of unadditized coating material formulations. Moreover, the block copolymers of the formula I according to the invention, and the polymer compositions comprising them, give such coatings an enhanced soil repellency effect, more particularly a water repellency effect, and are therefore suitable for reducing the soiling tendency of coatings, and also as a hydrophobizing antigraffiti additive.

The invention also relates, accordingly, to the use of the block copolymers of the formula I according to the invention and of the polymer compositions comprising them as additives in coating materials which comprise at least one organic binder.

The present invention also relates, more particularly, to the use of the block copolymers of the formula I according to the invention and of the polymer compositions comprising them as flow control assistants in coating materials which comprise at least one organic binder.

The present invention also relates, furthermore, to the use of the block copolymers of the formula I according to the invention and of the polymer compositions comprising them as a soil repellency additive, more particularly as a hydrophobizing antigraffiti agent, in coating materials which comprise at least one organic binder.

The advantages according to the invention are manifested especially when the organic binder is a binder which cures after application. Included here in particular are
  formulations which as organic binder comprise a thermosetting binder, such as, for example, epoxide formulations, e.g., mixtures of epoxy resins with aminic hardeners, epoxy-phenolic resin mixtures, and polyester-melamine-epoxy resin formulations, melamine resin formulations, e.g., alkyd-melamine resin formulations, polyester-melamine resin formulations, polyester-melamine resin formulations with isocyanate hardeners, and acrylate-melamine resin formulations, and also phenolic resin formulations,
  2-component polyurethane formulations,
  2-component epoxy formulations,
  radiation-curable compositions, and
  oxidatively curing formulations.

By 2-component polyurethane formulations are meant formulations which as binder comprise at least one polyol component, examples being low molecular mass compounds having at least two hydroxyl groups, and also oligomeric or polymeric substances having on average at least two hydroxyl groups per molecule, such as a polyacrylate polyol, a polyether polyol, or a polyester polyol, for example, and at least one isocyanate hardener, i.e., an oligomeric compound having on average at least 2.1 NCO groups per molecule, e.g., a biuret, allophanate, or cyanurate of the aforementioned diisocyanates. These 2-component formulations cure to form a polyurethane network.

By 2-component epoxide formulations are meant formulations which as binder comprise at least one epoxy resin, e.g., an epoxy resin based on a diglycidyl ether of bisphenol A, or based on a diglycidyl ether of ring-hydrogenated bisphenol A, and at least one arninic hardener, i.e., a low molecular mass or oligomeric compound having at least two primary and/or secondary amino groups.

By radiation-curable compositions are meant formulations which comprise a binder based on photopolymerizable prepolymers that cure to a polymeric network in the presence of light or actinic radiation. The photopolymerizable prepolymers include more particular oligomers which have on average at least two ethylenically unsaturated groups, especially acrylate, methacrylate, or allyl groups, examples being urethane acrylates, polyether acrylates, and polyester acrylates.

By oxidatively curing formulations are meant formulations which as binder comprise an oligomeric substance which cures to a solid polymer film in the presence of oxygen. Examples of such substances are unsaturated fatty acids and esters of unsaturated fatty acids, examples being alkyd resins based on unsaturated fatty acids.

The invention also provides coating material formulations which comprise
a) at least one organic binder, more particularly at least one organic binder which is selected from thermosetting binders, radiation-curable compositions, oxidatively curing binders, epoxy resins, and 2-component polyurethane binders; and
b) at least one block copolymer of the formula I according to the invention, or a polymer composition of the invention.

The invention also provides coating material formulations based on a 2-component polyurethane formulation, the first formulation, which comprises
a') at least one binder component of the 2-component polyurethane formulation, preferably the polyol component, more particularly at least one polymeric polyol, and
b) at least one block copolymer of the formula I according to the invention or a polymer composition of the invention,
and a separate, second formulation which comprises the complementary binder component of the two-component polyurethane formulation, more particularly the isocyanate component.

The block copolymers of the invention and the polymer compositions of the invention are typically used here in an amount such that the total amount of block copolymer of the formula I in the coating material formulation is in the range from 0.01 to 5 wt. %, more particularly in the range from 0.1 to 3 wt. %, and especially in the range from 0.2 to 2 wt. %, based on the total weight of the coating material formulation.

Besides the binder and the block copolymer of the formula I according to the invention, the coating material formulations may comprise one or more constituents of the type that may typically be present in coating material formulations. The nature of these additional constituents is guided conventionally by the desired end use and by the particular binder system.

The further constituents include, in particular, colorants, such as dyes and pigments, fillers, liquid solvents and diluents, including those known as reactive diluents, and also conventional additives.

Suitable colorants are, in particular, organic and inorganic pigments. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", 2nd edition, 1995, VCH Verlagsgesellschaft, ISBN: 3-527-28744-2. Examples of inorganic pigments are metallic flakes, such as aluminum, and also aluminum oxide, iron(III) oxide, chromium(III) oxide, titanium(IV) oxide, zirconium(IV) oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof.

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application. The fillers can be added in an amount of 1 to 75 wt. %, based on the total weight of the composition.

Examples of solvents are, in particular, organic solvents, examples being those above-specified solvents L.1, L.2, L.3, L.4, L.5, and L.6, and also aliphatic and cycloaliphatic hydrocarbons and hydrocarbon mixtures.

Examples of reactive diluents are, in particular, the aforementioned monoethylenically unsaturated monomers, more particularly the abovementioned alkyl and cycloalkyl esters of acrylic acid or of methacrylic acid, and also heterocyclic acrylates and methacrylates such as tetrahydrofurfuryl (meth)acrylate and 1,3-dioxolan-4-ylmethyl (meth)acrylate, and also diethylenically or polyethylenically unsaturated monomers such as alkylene glycol diacrylates and dimethacrylates, such as 1,4-butanediol di(meth)acrylate and 1,6-hexanediol di(meth)acrylate, oligoalkylene glycol diacrylates and dimethacrylates such as diethylene glycol di(meth)acrylate, triethylene glycol di(meth)acrylate and dipropylene glycol di(meth)acrylate, and pentaerythritol di- and tri(meth)acrylate.

Suitable conventional additives include, for example, antioxidants, UV absorbers/light stabilizers, metal deactivators, antistats, reinforcers, fillers, antifogging agents, propellants, biocides, plasticizers, lubricants, emulsifiers, rheological agents, catalysts, photoinitiators, adhesion regulators, optical brighteners, flame retardants, antidrip agents, and nucleating agents, and also mixtures thereof.

The light stabilizers/UV absorbers, antioxidants, and metal deactivators that are optionally used preferably have a high migration stability and temperature resistance. They are selected, for example, from groups a) to t). The compounds of groups a) to g) and i) represent light stabilizers/UV absorbers, whereas compounds j) to t) act as stabilizers.
a) 4,4-Diarylbutadienes,
b) cinnamic esters,
c) benzotriazoles,
d) hydroxybenzophenones, e) diphenylcyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers, and
t) basic costabilizers.

The choice of suitable conventional additives for the composition of the invention is dependent on the particular end use of the coating material formulations, and may be determined in an individual case by the skilled person.

The application of the coating material formulation for the purpose of producing a coating on a substrate may take place by any customary application methods such as, for example, spraying, knife coating, spreading, pouring, dipping, or rolling. It is preferred to employ spray application methods such as, for example, compressed air spraying, airless spraying, high-speed rotation, electrostatic spray application (ESTA), optionally in conjunction with hot spray application, such as hot air spraying, for example. Application may be made at temperatures of max. 70 to 80° C., and so suitable application viscosities are achieved without the brief thermal exposure causing any change in or damage to the coating material and to its overspray, which may optionally be reprocessed. For instance, hot spraying may be configured such that the coating material is heated only very briefly in, or only shortly before, the spraying nozzle.

The spray booth that is used for application may be operated, for example, with an optionally temperature-controllable circulation system, which is operated with a suitable absorption medium for the overspray, an example being the coating material itself.

The above-described application methods can also be employed, of course, in the production of further coating films or of the basecoat film in the context of the production of a multicoat system. In this case, different coating materials may be employed to build up the various coats. Application to a basecoat film is preferred.

Substrates contemplated include all surfaces to be coated that are amenable to combined curing, both primed and unprimed surfaces, examples being metals, plastics, wood, ceramic, stone, textile, fiber composites, leather, glass, glass fibers, glass wool, rockwool, mineral-bound and resin-bound building materials such as plasterboard panels and cement slabs, or roofing shingles.

The examples below serve to illustrate the invention.

Analysis:

The dynamic coefficient of friction (COF) was determined using a COF tester from Labthink Instruments Co. Ltd. by the "pull-meter" method (ASTM C-1028-96).

The molecular weight of the graft copolymers was determined by gel permeation chromatography (GPC) on an instrument from Waters. The samples were chromatographed in tetrahydrofuran (1 ml/min) through 4 packed columns (each 30 cm) at 25° C. The column material consisted of crosslinked polystyrene-divinylbenzene particles (ø=5 μm; pore size: 2×500 Å, 1×1000 Å, 1×10 000 Å). Detection took place by means of a differential refractometer.

Materials Used:

Heptamethyltrisiloxane: SiH group content 4.494 mmol/g; molecular weight M: 222.5 g/mol; available commercially as bis(trimethylsiloxy)methylsilane in 97% purity from ABCR.

Dihydro-polydimethylsiloxane 1:

SiH group content 1.382 mmol/gl; weight-average molecular weight $M_w$: 1447.2; prepared by equilibrating a mixture of octamethylcyclotetrasiloxane and tetramethyldisiloxane.

Dihydro-polydimethylsiloxane 2:

SiH group content 2.796 mmol/gl; weight-average molecular weight $M_w$: 715.3; prepared by equilibrating a mixture of octamethylcyclotetrasiloxane and tetramethyldisiloxane.

OH-functionalized polyacrylate: hydroxyl number 130-150, 60% strength by weight in butyl acetate (Synthalat® A150 from Synthopol)

Dibutyltin dilaurate (Tinstab® BL 277 from Ackros Chemicals)

Isocyanate hardener: biuret of hexamethylene diisocyanate, with an NCO content of 16.3 wt. %, determined according to DIN EN ISO 11909 (Desmodur® N75, Bayer)

Commercial Silicone Additive for Printing Inks: BYK310 from Byk Additives and Instruments I. Preparation of NCO-Functional Polyacrylates PA-1 to PA-3—General Procedure:

i) A 500 ml three-neck flask, equipped with stirrer, thermometer, reflux condenser, and nitrogen inlet line, was charged with 2-(2,6-diethyl-2,3,6-trimethyl-4-oxo-piperidin-1-yloxy)-N-(2-hydroxyethyl)-2-methylpropionamide (chain transfer agent) and n-butyl acrylate (n-BuA), and degassed. The clear solution was heated to 125° C. under nitrogen and polymerized to a given solids content. The reaction mixture was subsequently cooled to 60° C. and the unreacted n-butyl acrylate was distilled off under a high vacuum. Yellowish viscous oils of an OH-functionalized polybutyl acrylate were obtained.

ii) The OH-functionalized polybutyl acrylate from step i) was dissolved in 100 g of dry butyl acetate, and 25 mg of dibutyltin dilaurate were added. Then the corresponding amount of isophorone diisocyanate (IPDI) was added and the mixture was stirred at 60° C. for a further 6 hours. This gave a solution of the respective NCO-functionalized polymer PA-1 to PA-3, which had the following composition:

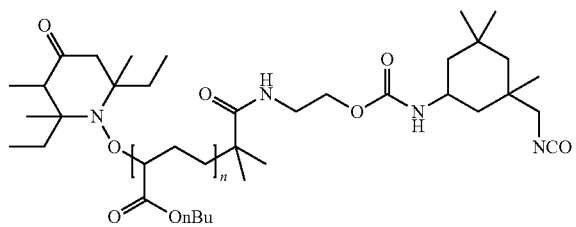

The reaction batches are summarized in the table below.

| No. | Chain transf. agent [g] | n-BuA [g] | SC @[2] 150° C. [%] | OH-PA[3] [g] | IPDI[4] [g] | NCO-polyacrylate solution[5] n | [g] | NCO content [mmol/g sol.] |
|---|---|---|---|---|---|---|---|---|
| PA-1 | 34.25 | 384.5 | 54.1 | 226.5 | 22.23 | 15 | 348.7 | 0.287 |
| PA-2 | 17.13 | 320.3 | 52.5 | 177.3 | 11.13 | 30 | 288.4 | 0.173 |
| PA-3 | 6.85 | 384.5 | 50.9 | 199.1 | 4.45 | 75 | 303.6 | 0.066 |

1) n-BuA: n-butyl acrylate
[2] The solids content determinations were performed on an HG 63 halogen dryer from Mettler-Toledo
[3] OH-PA: amount of OH-functionalized polyacrylate obtained in step i)
[4] Amount of isophorone diisocyanate in step ii)
[5] NCO content of the solution obtained in step ii), in mmol of NCO per gram of solution

II. Preparation of OH-Functional Siloxanes SiOH1 to SiOH6

The equimolar reaction mixture of alkynol and H-siloxane in 100 ml of n-butyl acetate was boiled at reflux for 2.5 hours in the presence of 0.000045 mol of $H_2PtCl_6$/mol of triple bond. The conversion was quantitative. The solvent was removed by distillation under reduced pressure. The reaction batches are summarized in the table below.

| No. | Alkynol Amount [g] | Type | H-Polydimethylsiloxane Amount [g] | Type | Product OH number [mg KOH/g] |
|---|---|---|---|---|---|
| SiOH-1 | 6.7 | PA | 85.9 | Dihydro-polydimethylsiloxane 1 | 72.4 |
| SiOH-2 | 6.7 | PA | 42.5 | Dihydro-polydimethylsiloxane 2 | 136.2 |
| SiOH-3 | 10.2 | BID | 85.9 | Dihydro-polydimethylsiloxane 1 | 138.4 |
| SiOH-4 | 9.6 | PA | 38.0 | Heptamethyltrisiloxane | 201.8 |
| SiOH-5 | 10.2 | BID | 42.5 | Dihydro-polydimethylsiloxane 2 | 252.3 |
| SiOH-6 | 14.7 | BID | 38.0 | Heptamethyltrisiloxane | 363.6 |

BID: butynediol;
PA: propargyl alcohol

EXAMPLES 1 TO 6: PREPARATION OF BLOCK COPOLYMERS OF THE INVENTION (GENERAL PROCEDURE)

The solutions of the NCO-functional polyacrylates PA-1, PA2 or PA-3, obtained under I, were mixed with the OH-functional siloxanes SiOH-1 to SiOH-6, indicated in the following table, and stirred under an inert gas atmosphere at 60° C. until NCO conversion was complete (approximately 6 hours). The conversion was monitored via NCO titration. The reaction batches are summarized in the table below.

IV Performance Testing

The block copolymers of the invention were tested for their activity as slip agents and leveling agents. The parameter measured was the reduction in the coefficient of friction (COF). A 2-component coating formulation with the following composition was employed:

| Component A: | 89.0 g | Synthalat A150 |
|---|---|---|
| | 10.0 g | Butyl acetate |
| | 0.5 g | Block copolymer |
| | 0.5 g | Dibutyltin dilaurate as 1% strength solution in butyl acetate |
| Total | 100 g | |
| Component B: | 35.0 g | Desmodur N75 (hardener) |

Components A and B were mixed in a ratio of 100:35. The resulting clearcoat was then applied to PE film, using a 75 μm coating bar, and cured overnight at room temperature. The dynamic coefficient of friction (Dyn. COF) was determined by the method described earlier.

| Example | Dyn. COF |
|---|---|
| Blank | 0.36 |
| BYK310 | 0.25 |
| 1 | 0.16 |
| 2 | 0.35 |
| 3 | 0.19 |
| 4 | 0.27 |
| 5 | 0.21 |
| 6 | 0.22 |
| 7 | 0.34 |

The invention claimed is:
1. A block copolymer of the general formula I

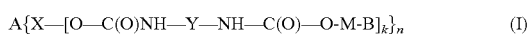

$$A\{X-[O-C(O)NH-Y-NH-C(O)-O-M-B]_k\}_n \quad (I)$$

| | NCO-funct. polyacrylate [g] | | | OH-funct. polydimethylsiloxane [g] | | | | | |
|---|---|---|---|---|---|---|---|---|---|
| Example | PA-1 | PA-2 | PA-3 | SiOH-1 | SiOH-2 | SiOH-3 | SiOH-4 | SiOH-5 | SiOH-6 |
| 1 | 50.0 | — | — | — | — | — | 1.5 | — | — |
| 2 | — | 100.0 | — | — | — | — | 1.0 | — | — |
| 3 | — | 100.0 | — | — | — | 1.8 | — | — | — |
| 4 | — | — | 50.0 | 1.3 | — | — | — | — | — |
| 5 | 50.0 | — | — | — | 3.0 | — | — | — | — |
| 6 | 50.0 | — | — | — | — | — | — | 0.8 | — |
| 7 | 50.0 | — | — | — | — | — | — | — | 2.0 | in which n is a number in the range from 2 to 40;

k is 1 or 2;

A is a poly(dimethylsiloxane) block;

B is a polymer block which comprises polymerized units of one or more ethylenically unsaturated monomers and which optionally has an end group other than hydrogen;

X is a divalent or trivalent radical having 2 to 20 C atoms, which is saturated or unsaturated and which optionally carries 1, 2, 3, or 4 substituents selected from OH, COOH, CONH$_2$, C$_1$-C$_4$ alkoxy, C$_1$-C$_4$ alkoxycarbonyl, and halogen;

Y is a divalent hydrocarbon radical having 2 to 20 C atoms, which is saturated or unsaturated, M is a chemical bond or C$_2$-C$_{10}$ alkylene which may be interrupted by one or two groups that are not directly adjacent and that are selected from O, C(=O)O, and (C=O)NH, and which optionally carries 1, 2, 3, or 4 substituents selected from OH, COOH, CONH$_2$, C$_1$-C$_4$ alkoxy, C$_1$-C$_4$ alkoxycarbonyl, and phenyl, wherein A is the only poly(dimethylsiloxane) block in the block copolymer, the polymer block B has a number-average molecular weight in the range from 1000 to 50 000 g/mol, and the polymer block B comprises, to an extent of at least 50 wt. % based on B, polymerized units of one or more monoethylenically unsaturated monomers selected from the group consisting of esters of acrylic acid with C$_1$-C$_{20}$ alkanols, esters of methacrylic acid with C$_1$-C$_{20}$ alkanols, esters of acrylic acid with C$_5$-C$_{20}$ cycloalkanols, esters of methacrylic acid with C$_5$-C$_{20}$-cycloalkanols, esters of acrylic acid with polyethermonools, and esters of methacrylic acid with polyethermonools.

2. The block copolymer according to claim 1, wherein the polydimethylsiloxane block A has a number-average molecular weight in the range from 200 to 20 000 g/mol.

3. The block copolymer according to claim 1, having a number-average molecular weight in the range from 1500 to 200 000 g/mol.

4. The block copolymer according to claim 1, wherein the polydimethylsiloxane block A makes up 0.1 to 70 wt. %, based on the total mass of the block copolymer.

5. The block copolymer according to claim 1, wherein the polymer block B has a terminal group of the formula Z

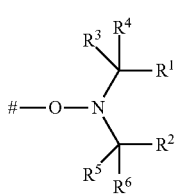

(Z)

in which # denotes the attachment to a C atom of the polymer block B,

R$^1$ and R$^2$ independently of one another are C$_1$-C$_{20}$ alkyl which optionally carries a substituent selected from C$_1$-C$_4$ alkoxy and C$_1$-C$_4$ alkoxy-C$_1$-C$_4$ alkoxy, or R$^1$ and R$^2$ together are linear C$_2$-C$_{10}$ alkylene or linear C$_2$-C$_{10}$ alkenylene in which optionally one or two CH$_2$ groups may have been replaced by O, C=O, or NR$^x$, where linear C$_2$-C$_{10}$ alkylene and linear C$_2$-C$_{10}$ alkenylene are unsubstituted or have 1, 2, 3, or 4 substituents from the group C$_1$-C$_4$ alkyl, C$_1$-C$_4$ alkoxy, C$_1$-C$_4$ alkoxy-C$_1$-C$_4$ alkoxy, COOH, and CONH$_2$, and R$^x$ is C$_1$-C$_4$ alkyl or C$_1$-C$_4$ alkoxy;

R$^3$, R$^4$, R$^5$, and R$^6$ independently of one another are C$_1$-C$_4$ alkyl.

6. The block copolymer according to claim 1, wherein n is on average 2 to 10.

7. The block copolymer according to claim 1, wherein X is C$_2$-C$_{10}$ alkylene or C$_2$-C$_{10}$ alkenylene which are unsubstituted or have 1 or 2 substituents from the group OH, C$_1$-C$_4$ alkoxy, COOH, and C$_1$-C$_4$ alkoxycarbonyl, the C$_2$-C$_{10}$ alkylene being optionally interrupted by 1, 2, 3, or 4 nonadjacent oxygen atoms.

8. The block copolymer according to claim 1, wherein Y is C$_2$-C$_{10}$ alkylene, C$_2$-C$_{10}$ alkenylene, C$_5$-C$_{10}$ cycloalkylene, which optionally has 1, 2, or 3 methyl groups, phenylene, which optionally has 1, 2, or 3 methyl groups, or a group Q-R-(Q)$_q$, in which q is 0 or 1, Q is C$_5$-C$_{10}$ cycloalkylene, which optionally has 1, 2, or 3 methyl groups, or phenylene, which optionally has 1, 2, or 3 methyl groups, and R is C$_1$-C$_{10}$ alkylene.

9. The block copolymer according to claim 1, obtainable by a process which comprises the following steps:

i) providing an OH-functionalized poly(dimethylsiloxane) of the formula A[X(—OH)$_k$]$_n$, ii) providing an OH-functionalized polymer B-M-OH which is composed of ethylenically unsaturated monomers;

iii) reacting the OH-functionalized polymer B-M-OH which is composed of ethylenically unsaturated monomers with a diisocyanate of the formula II

O=C=N—Y—N=C=O                (II)

to give an isocyanate-functionalized polymer of the formula III:

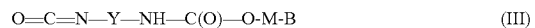

O=C=N—Y—NH—C(O)—O-M-B       (III)

wherein n is a number in the range from 2 to 40;

k is 1 or 2;

A is a poly(dimethylsiloxane) block;

X is a divalent or trivalent radical having 2 to 20 C atoms, which is saturated or unsaturated and which optionally carries 1, 2, 3, or 4 substituents selected from OH, COOH, CONH$_2$, C$_1$-C$_4$ alkoxy, C$_1$-C$_4$ alkoxycarbonyl, and halogen;

B is a polymer block which comprises polymerized units of one or more ethylenically unsaturated monomers and which optionally has an end group other than hydrogen;

Y is a divalent hydrocarbon radical having 2 to 20 C atoms, which is saturated or unsaturated, M is a chemical bond or C2-C10 alkylene which may be interrupted by one or two groups that are not directly adjacent and that are selected from O, C(=O)O, and (C=O)NH, and which optionally carries 1, 2, 3, or 4 substituents selected from OH, COOH, CONH2, C1-C4 alkoxy, C1-C4 alkoxycarbonyl, and phenyl;

iv) reacting the isocyanate-functionalized polymer of the formula III with the OH-functionalized poly(dimethylsiloxane) of the formula A[X(—OH)$_k$]$_n$ provided in step i), wherein the polymer block B has a number-average molecular weight in the range from 1000 to 50 000 g/mol, and the polymer block B comprises, to an extent of at least 50 wt. % based on B, polymerized units of one or more monoethylenically unsaturated monomers selected from the group consisting of esters of acrylic acid with C$_1$-C$_{20}$ alkanols, esters of methacrylic acid with C$_1$-C$_{20}$ alkanols, esters of acrylic acid with C$_5$-C$_{20}$ cycloalkanols, esters of methacrylic acid with C$_5$-C$_{20}$- cycloalkanols, esters of acrylic acid with polyethermonools, and esters of methacrylic acid with polyethermonools.

10. A process for preparing a block copolymer according to claim 1, which comprises the following steps:
i) providing an OH-functionalized poly(dimethylsiloxane) of the formula $A[X(\text{---OH})_k]_n$,
ii) providing an OH-functionalized polymer B-M-OH which comprises polymerized units of one or more ethylenically unsaturated monomers;
iii) reacting the OH-functionalized poly(dimethylsiloxane) of the formula $A[X(\text{---OH})_k]_n$, provided in step i), with a diisocyanate of the formula II

to give an isocyanate-functionalized polydimethylsiloxane of the formula IV:

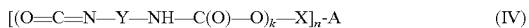

wherein
n is a number in the range from 2 to 40;
k is 1 or 2;
A is a poly(dimethylsiloxane) block;
X is a divalent or trivalent radical having 2 to 20 C atoms, which is saturated or unsaturated and which optionally carries 1, 2, 3, or 4 substituents selected from OH, COOH, $CONH_2$, $C_1$-$C_4$ alkoxy, $C_1$-$C_4$ alkoxycarbonyl, and halogen;
B is a polymer block which comprises polymerized units of one or more ethylenically unsaturated monomers and which optionally has an end group other than hydrogen;
Y is a divalent hydrocarbon radical having 2 to 20 C atoms, which is saturated or unsaturated,
M is a chemical bond or C2-C10 alkylene which may be interrupted by one or two groups that are not directly adjacent and that are selected from O, C(=O)O, and (C=O)NH, and which optionally carries 1, 2, 3, or 4 substituents selected from OH, COOH, CONH2, C1-C4 alkoxy, C1-C4 alkoxycarbonyl, and phenyl;
iv) reacting the isocyanate-functionalized polymer of the formula III with the OH-functionalized polymer B-M-OH composed of ethylenically unsaturated monomers that was provided in step ii),
wherein the polymer block B has a number-average molecular weight in the range from 1000 to 50 000 g/mol, and the polymer block B comprises, to an extent of at least 50 wt. % based on B, polymerized units of one or more monoethylenically unsaturated monomers selected from the group consisting of esters of acrylic acid with $C_1$-$C_{20}$ alkanols, esters of methacrylic acid with $C_1$-$C_{20}$ alkanols, esters of acrylic acid with $C_5$-$C_{20}$ cycloalkanols, esters of methacrylic acid with $C_5$-$C_{20}$-cycloalkanols, esters of acrylic acid with polyethermonools, and esters of methacrylic acid with polyethermonools.

11. A polymer composition comprising at least one block copolymer of the formula I according to claim 1.

12. A coating material formulation which comprises at least one organic binder and the block copolymer according to claim 1 as an additive.

13. The coating material formulation according to claim 12, wherein the binder is thermally curable.

14. The coating material formulation according to claim 12, wherein the coating material formulation is a 2-component polyurethane formulation, an epoxide formulation, a radiation-curable composition, or an oxidatively curing formulation.

15. A coating material formulation which comprises at least one organic binder and the block copolymer according to claim 1 which is a flow control assistant.

16. A coating material formulation which comprises at least one organic binder and the block copolymer according to claim 1 which is a soil repellency additive.

17. A coating material formulation comprising
a) at least one organic binder and
b) at least one block copolymer of the formula I according to claim 1.

18. The coating material formulation according to claim 17, comprising at least one block copolymer of the formula I in an amount of 0.01 to 5 wt. %, based on the total weight of the coating material formulation.

19. The block copolymer according to claim 1, wherein n in formula (I) is from 2 to 5.

20. The block copolymer according to claim 1, wherein the polymer block B consists of polymerized units of one or more ethylenically unsaturated monomers.

21. The block copolymer according to claim 1, wherein the polymer block B consists of polymerized units of one or more selected from the group consisting of an ester of acrylic acid with a $C_1$-$C_{10}$ alkanol, an ester of methacrylic acid with a $C_1$-$C_{20}$ alkanol, an ester of acrylic acid with a $C_5$-$C_{20}$ cycloalkanoyl, an ester of methacrylic acid with a $C_5$-$C_{20}$ cycloalkanoyl.

22. The block copolymer according to claim 1, wherein the polymer block B consists of polymerized units of one or more ethylenically unsaturated monomers selected from the group consisting of an ester of acrylic acid with a $C_1$-$C_{20}$ alkanol, an ester of methacrylic acid with a $C_1$-$C_{20}$ alkanol.

23. The block copolymer according to claim 1, wherein the polymer block B is 60 to 95 wt % of the total weight of the block copolymer.

24. The block copolymer according to claim 1, wherein the polydimethylsiloxane block A has a number-average molecular weight in the range of from 500 to 10,000 g/mol.

25. The block copolymer according to claim 1, wherein the polymer block B has a number-average molecular weight in the range of from 2,000 to 20,000 g/mol.

26. The block copolymer according to claim 1, having a number average molecular weight in the range of from 2,000 to 100,000 g/mol.

27. The block copolymer according to claim 1, wherein the polydimethylsiloxane block A makes up 0.2 to 40 wt % based on the total mass of the block copolymer.

28. A polymer composition comprising at least one block copolymer of the formula I

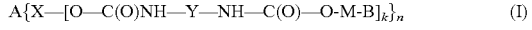

in which
n is a number in the range from 2 to 40;
k is 1 or 2;
A is a poly(dimethylsiloxane) block;
B is a polymer block which comprises polymerized units of one or more ethylenically unsaturated monomers and which optionally has an end group other than hydrogen;
X is a divalent or trivalent radical having 2 to 20 C atoms, which is saturated or unsaturated and which optionally carries 1, 2, 3, or 4 substituents selected from OH, COOH, $CONH_2$, $C_1$-$C_4$ alkoxy, $C_1$-$C_4$ alkoxycarbonyl, and halogen;
Y is a divalent hydrocarbon radical having 2 to 20 C atoms, which is saturated or unsaturated,
M is a chemical bond or $C_2$-$C_{10}$ alkylene which may be interrupted by one or two groups that are not directly adjacent and that are selected from O, C(=O)O, and (C=O)NH, and which optionally carries 1, 2, 3, or 4 substituents selected from OH, COOH, $CONH_2$, $C_1$-$C_4$ alkoxy, $C_1$-$C_4$ alkoxycarbonyl, and phenyl,
wherein A is the only poly(dimethylsiloxane) block in the block copolymer, the polymer composition does not comprise a polymer which comprises two or more poly(dimethylsiloxane) blocks, the polymer block B has a number-average molecular weight in the range from 1000 to 50 000 g/mol, and the polymer block B comprises, to an extent of at least 50 wt. % based on B, polymerized units of one or more monoethylenically unsaturated monomers selected from the group consisting of esters of acrylic acid with $C_1$-$C_{20}$ alkanols, esters of methacrylic acid with $C_1$-$C_{20}$ alkanols, esters of acrylic acid with $C_5$-$C_{20}$ cycloalkanols, esters of methacrylic acid with $C_5$-$C_{20}$-cycloalkanols, esters of acrylic acid with polyethermonools, and esters of methacrylic acid with polyethermonools.

29. The polymer composition according to claim 28, wherein the polydimethylsiloxane block A has a number-average molecular weight in the range from 200 to 20 000 g/mol.

30. The polymer composition according to claim 28, wherein the block copolymer has a number-average molecular weight in the range from 1500 to 200 000 g/mol.

31. The polymer composition according to claim 28, wherein the polydimethylsiloxane block A makes up 0.1 to 70 wt. %, based on the total mass of the block copolymer.

32. The polymer composition according to claim 28, wherein the polymer block B has a terminal group of the formula Z

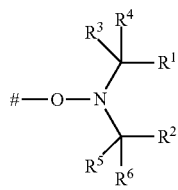

(Z)

in which # denotes the attachment to a C atom of the polymer block B, $R^1$ and $R^2$ independently of one another are $C_1$-$C_{20}$ alkyl which optionally carries a substituent selected from $C_1$-$C_4$ alkoxy and $C_1$-$C_4$ alkoxy-$C_1$-$C_4$ alkoxy, or $R^1$ and $R^2$ together are linear $C_2$-$C_{10}$ alkylene or linear $C_2$-$C_{10}$ alkenylene in which optionally one or two $CH_2$ groups may have been replaced by O, C=O, or $NR^x$, where linear $C_2$-$C_{10}$ alkylene and linear $C_2$-$C_{10}$ alkenylene are unsubstituted or have 1, 2, 3, or 4 substituents from the group $C_1$-$C_4$ alkyl, $C_1$-$C_4$ alkoxy, $C_1$-$C_4$ alkoxy-$C_1$-$C_4$ alkoxy, COOH, and $CONH_2$, and $R^x$ is $C_1$-$C_4$ alkyl or $C_1$-$C_4$ alkoxy;

$R^3$, $R^4$, $R^5$, and $R^6$ independently of one another are $C_1$-$C_4$ alkyl.

33. The polymer composition according to claim 28, wherein n is on average 2 to 10.

34. The polymer composition according to claim 28, wherein X is $C_2$-$C_{10}$ alkylene or $C_2$-$C_{10}$ alkenylene which are unsubstituted or have 1 or 2 substituents from the group OH, $C_1$-$C_4$ alkoxy, COOH, and $C_1$-$C_4$ alkoxycarbonyl, the $C_2$-$C_{10}$ alkylene being optionally interrupted by 1, 2, 3, or 4 nonadjacent oxygen atoms.

35. The polymer composition according to claim 28, wherein Y is $C_2$-$C_{10}$ alkylene, $C_2$-$C_{10}$ alkenylene, $C_5$-$C_0$ cycloalkylene, which optionally has 1, 2, or 3 methyl groups, phenylene, which optionally has 1, 2, or 3 methyl groups, or a group Q-R-$(Q)_q$, in which q is 0 or 1, Q is $C_5$-$C_{10}$ cycloalkylene, which optionally has 1, 2, or 3 methyl groups, or phenylene, which optionally has 1, 2, or 3 methyl groups, and R is $C_1$-$C_{10}$ alkylene.

* * * * *

UNITED STATES PATENT AND TRADEMARK OFFICE
CERTIFICATE OF CORRECTION

PATENT NO. : 10,301,434 B2
APPLICATION NO. : 14/759821
DATED : May 28, 2019
INVENTOR(S) : Lothar Engelbrecht et al.

It is certified that error appears in the above-identified patent and that said Letters Patent is hereby corrected as shown below:

In the Specification

In Column 5, Line 59, "$C_2$-$C_{20}$" should read -- $C_1$-$C_{20}$ --.

In Column 8, Line 40, "polydispesity" should read -- polydispersity --.

In Column 9, Line 38, "4''''" should read -- 4' --.

In the Claims

In Column 30, Line 13, Claim 32, "$R^X$" should read -- $R^x$ --.

Signed and Sealed this
Eleventh Day of February, 2020

Andrei Iancu
*Director of the United States Patent and Trademark Office*